(12) United States Patent
Nakase et al.

(10) Patent No.: US 6,538,678 B2
(45) Date of Patent: Mar. 25, 2003

(54) IMAGE FORMING APPARATUS WITH DEVELOPMENT CONTROLLER

(75) Inventors: Takahiro Nakase, Ibaraki (JP); Jun Asai, Chiba (JP); Yuji Kamiya, Chiba (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/897,949

(22) Filed: Jul. 5, 2001

(65) Prior Publication Data

US 2002/0005887 A1 Jan. 17, 2002

(30) Foreign Application Priority Data

Jul. 11, 2000 (JP) .......................... 2000-209716

(51) Int. Cl.$^7$ .......................... G03G 15/04; G03G 15/00
(52) U.S. Cl. .......................... 347/133; 347/140; 399/48; 399/56
(58) Field of Search ................. 347/133, 134, 347/243, 260, 261, 132, 140; 359/216, 217, 218, 219; 399/48, 51, 56

(56) References Cited

U.S. PATENT DOCUMENTS 3,995,110 A * 11/1976 Starkweather .............. 358/481
4,707,748 A * 11/1987 Ohtsuka et al. ............. 358/296
4,910,555 A * 3/1990 Namikawa et al. ......... 347/140
5,832,333 A * 11/1998 Umeda et al. ................ 399/48

* cited by examiner

*Primary Examiner*—Joan Pendegrass
(74) *Attorney, Agent, or Firm*—Fitzpatrick, Cella, Harper & Scinto

(57) ABSTRACT

A high quality image forming apparatus capable of outputting a quality image at a high speed is provided, with which no unevenness is generated on an image and a fog or a change in density is less likely to occur. An exposing unit is operated by an over-filled scanner method for exposure by a rotational polygon mirror that reflects lights on a surface narrower than an incident beam width, and forms an electrostatic latent image by back area exposure for exposing a non-image part.

7 Claims, 7 Drawing Sheets

MIRROR SURFACE WIDTH

BEAM TO BE REFLECTED (INCIDENT BEAM WIDTH)

BEAM TO BE REFLECTED (INCIDENT BEAM WIDTH)

IMAGE FORMING APPARATUS WITH DEVELOPMENT CONTROLLER

BACKGROUND OF THE INVENTION

1. Field of the Invention

The present invention relates to an image forming apparatus, for example a copying machine, a printer, a facsimile apparatus or the like, which is provided with a function of forming an image on a recording medium such as a sheet.

2. Description of the Related Art

Conventionally, as an image forming apparatus of this type, many digital image forming apparatus use an IAE method (image area exposure, FIG. 12) for subjecting an image part of an image to laser exposure. Exposure is performed by the IAE method because, with the IAE method, a line width can be made larger by increasing an amount of light and a lifetime of a laser can be longer due to a short laser irradiation time.

In addition, a UFS (Under-Filled Scanner, FIGS. 9 and 10) method having a polygon mirror surface wider than a width in the main scanning direction of light incident on the polygon mirror (an incident beam width) is used in a laser scan optical system. Since a width of a laser beam reflected on a polygon mirror is fixed in the UFS method, it has an advantage in that an amount of laser light is equal in the longitudinal direction of a photosensitive member.

Therefore, a conventional image forming apparatus often performs laser exposure of the IAE method using a polygon mirror of the UFS method.

However, as processing of an image forming apparatus is getting faster, rise in temperature and noises have emerged as problems because a large polygon mirror is used in the UFS method.

As a measure to cope with these problems, there is an OFS (Over-Filled scanner, FIGS. 7 and 8) method using a small polygon mirror.

In an OFS method a polygon mirror surface is narrower than an incident beam width and is smaller than in the UFS method. Thus, an OFS is excellent in speed and definition because heating and noises can be restrained, start-up is fast and a spot diameter of a laser beam can be made small.

Therefore, exposure is performed in a recent high-speed digital image forming apparatus by the IAE method using an OFS.

However, in the case of the above-mentioned conventional art, there are problems mentioned below.

Since in the OFS method a photosensitive member is irradiated with a part of a beam as shown in FIGS. 7 and 8, a reflected beam width varies in response to an angle of a laser incident on a polygon mirror. As a result, a amount of laser light is unequal in the longitudinal direction.

More specifically, there is a disadvantage in the OFS method in that an amount of laser light decreases from about 5 to 10% on an end side compared with a central part while there is hardly any decrease in a amount of laser light at an end in the longitudinal direction on a photosensitive member compared with a central part in the UFS method as shown in FIG. 4.

As a measure to cope with this disadvantage, there is a method of controlling a amount of laser light such that the amount of laser light is decreased when a central part in the longitudinal direction of a photosensitive member is irradiated and is increased when an end part is irradiated. There is also a method of decreasing a light amount at a central part by applying coating on a lens or a mirror on a path which a beam scanned by a polygon mirror reaches a photosensitive member.

However, controlling the amount of laser light where accuracy is required, a method of increasing accuracy in laser irradiation, or a method using a lens of a special shape is costly. A method of applying coating to a lens or a mirror is also costly and, in addition, loses a large amount of light, which may lead to shortage of the amount of laser light.

In addition, a potential unevenness is generated in a pitch shape in a drum's circumferential direction because of an unevenness of a rotational period of a polygon, a rotational period of a driving gear of a photosensitive member, or the like in a laser exposed part of an electrostatic image created by a laser beam that is scanned using a polygon mirror (FIG. 11).

That is, the IAE method for making the laser exposed part an image part has a disadvantage in that an unevenness of a pitch shape, a white line or a black line is generated in an image part.

As a measure to cope with this disadvantage, there is a method of decreasing a plane tilt or the like of a polygon mirror to increase the accuracy of laser irradiation on a photosensitive member. There is also a method of using a flywheel for preventing a periodical unevenness of a photosensitive member, changing a material of a driving gear, or changing engagement of a driving gear. In addition, there is a method of making an unevenness less noticeable by increasing a development contrast potential ($V_{CONT}$) and applying a lot of toner.

However, the method of increasing the development contrast potential $V_{CONT}$ has problems such as splash, scattering of toner and increased consumption of toner because a toner density is too high due to the increased amount of toner applied.

SUMMARY OF THE INVENTION

The present invention has been devised in order to solve the above-mentioned problems of the conventional art, and it is an object of the present invention to provide a high quality image forming apparatus that has no unevenness and less possibility of occurrence of a fog or a change in density and is capable of outputting a quality image at a high speed.

In the present invention, an image forming apparatus is provided, which comprises an image bearing member for bearing an electrostatic latent image; and exposing means for exposing said image bearing member to form an electrostatic latent image, wherein the exposing means has a rotational polygon mirror having an incident beam reflecting surface that is narrower than an incident beam width and exposes a non-image part of an image to form an electrostatic latent image.

According to the present invention, the exposing means is operated by an over-filled scanner method for exposure by a rotational polygon mirror for reflecting light on a surface narrower than an incident beam width and forms an electrostatic latent image by back area exposure for exposing a non-image part. Therefore, a high resolution image can be outputted at a high speed and prevention of occurrence of a fog or a scanning unevenness can be realized with reduced costs.

In addition, it is preferable that the image forming apparatus further comprises potential detecting means for detecting a surface potential of the image bearing member, development bias applying means for applying a development bias voltage to developing means for developing the electrostatic latent image; and image forming conditions operating means for calculating a DC component value of the development bias voltage applied by the development bias applying means in response to detection results of the potential detecting means.

In this way, since the image forming apparatus is provided with the image forming conditions operating means for controlling the DC component value of a development bias applied by the development bias power source in response to detection results of the potential detecting means, occurrence of a fog and a scanning unevenness can be prevented.

In addition, it is preferable that the image forming conditions operating means calculates the DC component value of the development bias voltage as a value found by adding a predetermined value to a potential in an exposed part that is exposed by the exposing means among surface potentials of the image bearing member detected by the potential detecting means.

In addition, it is preferable that the potential detecting means is arranged such that it detects a potential of an end in the longitudinal direction of the image bearing member, and the image forming conditions operating means calculates the DC component value of the development bias voltage as a value found by adding a predetermined value to a potential of an exposed part at the end in the longitudinal direction of the image bearing member detected by the potential detecting means.

In addition, it is preferable that the potential detecting means is arranged such that it detects a potential of a region other than the end in the longitudinal direction of the image bearing member, and the image forming conditions operating means estimates a potential at an end in the longitudinal direction of the image bearing member from the surface potential of the image bearing member detected by the potential detecting means based on a characteristic of an amount of light irradiated by the exposing means and calculates the DC component value of the development bias voltage as a value found by adding a predetermined value to the estimated potential at the end.

In addition, it is preferable that the potential detecting means is arranged such that it detects a potential of a region other than the end in the longitudinal direction and the central part of the image bearing member.

In addition, it is preferable that, if the image forming conditions operating means determines that an absolute value of a potential of the exposed part of the image bearing member is larger than a predetermined potential, the image forming conditions operating means controls an amount of light on the surface of the image bearing body irradiated by the exposing means such that the detected potential of the exposed part becomes the predetermined value.

In addition, it is preferable that, if the image forming conditions operating means determines that an absolute value of the estimated potential of the end in the longitudinal direction of the image bearing member is larger than a predetermined potential, the image forming conditions operating means controls an amount of light on the surface of the image bearing member irradiated by the exposing member such that the potential at the end becomes the predetermined potential.

In addition, it is preferable that the predetermined value is a value for preventing occurrence of a fog in the exposed part.

In addition, it is preferable that the predetermined value is a value for preventing occurrence of a fog at the end in the longitudinal direction of the image bearing member.

In addition, it is preferable that the image forming conditions operating means controls an amount of light on the surface of the image bearing member irradiated by the exposing means based on a difference between the DC component value of the development bias voltage and the potential of the end in the longitudinal direction of the image bearing member.

In addition, it is preferable that the image bearing member is an amorphous silicon (a-Si) photosensitive member.

As described above, influences on an image density by endurance can be almost eliminated and a quality image close to an initial state can be realized by using the a-Si photosensitive member.

In addition, in the present invention, a method of controlling an image forming conditions of an image forming apparatus for back-area exposing an image bearing member by light scanned by the over-filled scanner method to form an electrostatic latent image is provided, which comprises: detecting a surface potential of an image bearing member for bearing an electrostatic latent image; and calculating a DC component value of a development bias voltage applied to a developing means for developing the electrostatic latent image on the image bearing member.

In addition, it is preferable that the surface potential of the image bearing member to be detected is a potential of an exposed part at an end in the longitudinal direction of the image bearing member, and the DC component value of the development bias voltage is calculated as a value found by adding a predetermined value to the detected potential of the exposed part when the DC component value of the development bias voltage is calculated in response to the detected surface potential of the image bearing member.

In addition, it is preferable that the surface potential of the image bearing member to be detected is a potential of a region other than the end in the longitudinal direction of the image bearing member, and the potential of the end in the longitudinal direction of the image bearing member is estimated from the detected surface potential of the image bearing member based on a characteristic of the amount of exposing light irradiated on the image bearing body, and the DC component value of the development bias voltage is calculated as a value found by adding a predetermined value to the estimated potential of the end in the longitudinal direction the image bearing member when the DC component value of the development bias voltage is calculated in response to the detected surface potential of the image bearing member.

In addition, it is preferable that it is determined whether or not an absolute value of the detected potential of the exposed part of the end in the longitudinal direction of the image bearing member is larger than a predetermined potential, and if the absolute value of the detected potential of the exposed part of the end in the longitudinal direction of the image bearing member is larger than the predetermined potential, an amount of light irradiated on the surface of the image bearing member is controlled such that the potential of the exposed part becomes the predetermined value.

In addition, it is preferable that it is determined whether or not an absolute value of the estimated potential of the end in the longitudinal direction of the image bearing member is larger than a predetermined value, and if the absolute value of the estimated potential of the end in the longitudinal direction of the image bearing member is larger than the predetermined potential, an amount of light irradiated on the surface of the image bearing member is controlled such that the potential at the end becomes the predetermined value.

DESCRIPTION OF THE PREFERRED EMBODIMENTS

Preferred embodiments of the present invention will be hereinafter described in detail by means of illustration with reference to the accompanying drawings.

[First Embodiment]

Figure 1:
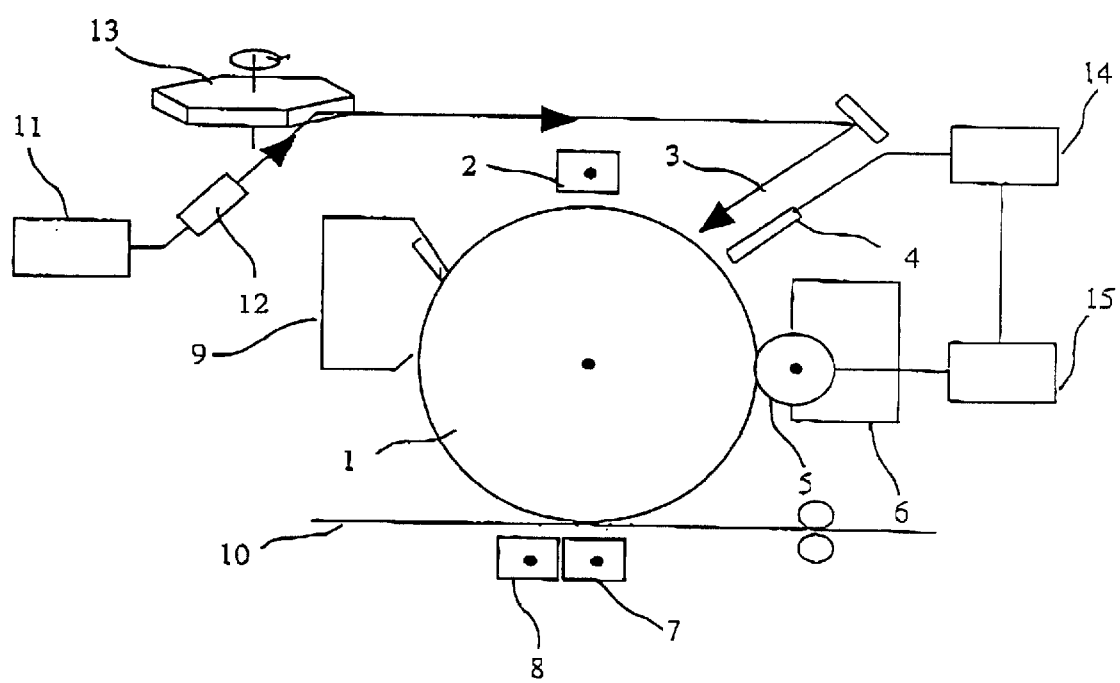
FIG. 1 is a schematic sectional view of an image forming apparatus in accordance with an embodiment of the present invention.
Figure 2:
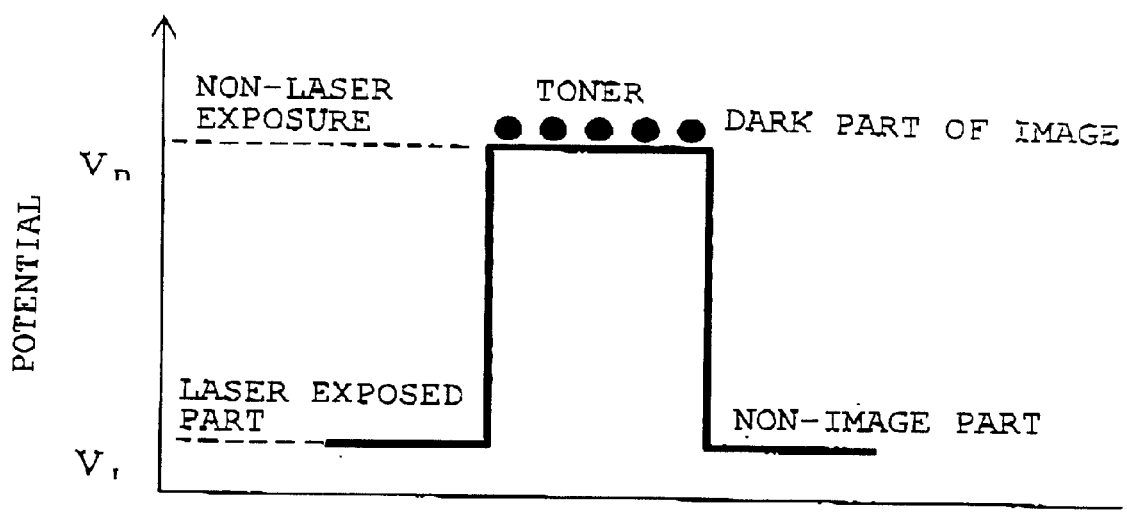
FIG. 2 is a diagram showing an association of an exposed part and an image part of a BAE method.

FIG. 1 is a schematic sectional view of a main part of an image forming apparatus in accordance with a first embodiment of the present invention. As a characteristic configuration of this embodiment, exposing means uses a polygon mirror of an OFS method and uses a SAE (Back Area Exposure) method (FIG. 2) with which a non-laser exposed part is made an image part and a non-image part (white part) is subject to laser exposure.

Image forming operations by image forming means will be hereinafter described schematically.

A laser beam modulated by a digital signal generating device 11 and a laser 12 according to image information is projected by a polygon mirror 13 in the OFS method on a surface of an a-Si photosensitive member 1, which is equally charged to 500V (non-exposed part potential $V_D$) by a primary charging device 2. A digital electrostatic latent image is formed using the BAE method.

Then, the digital electrostatic latent image is normally developed by a developing device 6 to form a toner image, and the toner image is transferred on a transfer material 10 by a transferring device 7 and separated by a separating device B. The toner image is then fixed on the transfer material 10 by a fixing device (not shown) and is outputted as an image. Further, toner that was not transferred on the transfer material 10 is removed by a cleaner 9.

Here the amount of laser exposure decreases at an end compared with a central part in an OFS method. Thus, a laser exposed part potential $V_l$ on the surface of the photosensitive member 1 on which the digital electrostatic latent image is formed is set to be 70V at the central part and 100V at the end.

Figure 3:
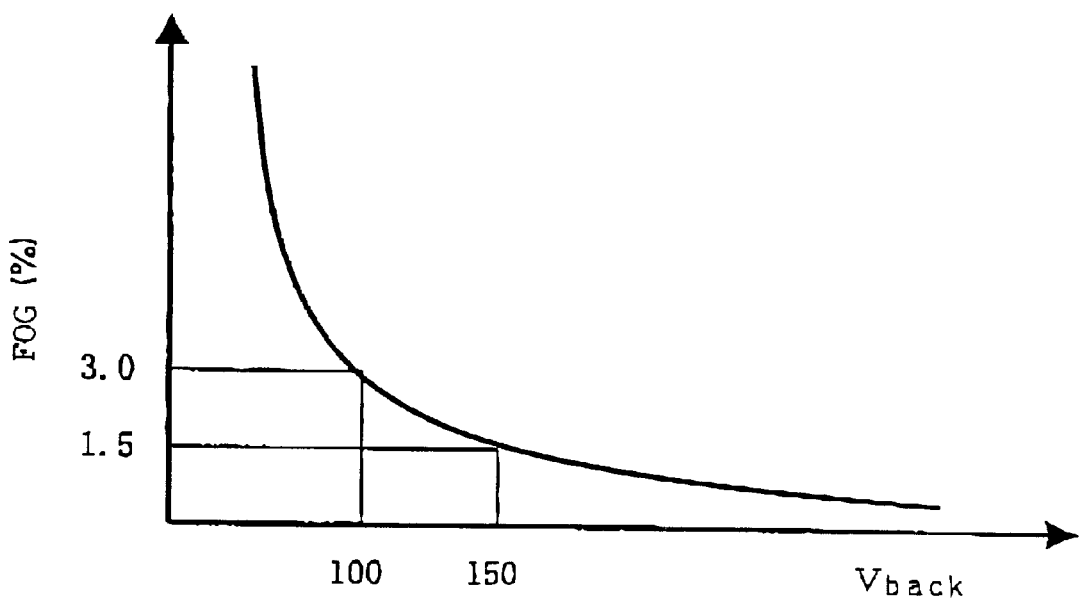
FIG. 3 is a diagram showing a fog latitude.

If a potential detecting sensor 4 as a potential detecting means is provided at a central part in the longitudinal direction of an image forming region on the surface of the photosensitive member 1, the potential detecting sensor 4 reads the laser exposed part potential $V_L$. An image forming conditions operating device 14 as image forming conditions operating means then adds a fog contrast $V_{BACK}$ of 150V to the laser exposed part potential $V_L$ as a predetermined value at which a fog is not generated. However, the fog contrast $V_{BACK}$ at the end decreases to 120V, and a fog increases from 1.5% to 3.0% (FIG. 3).

Figure 4:
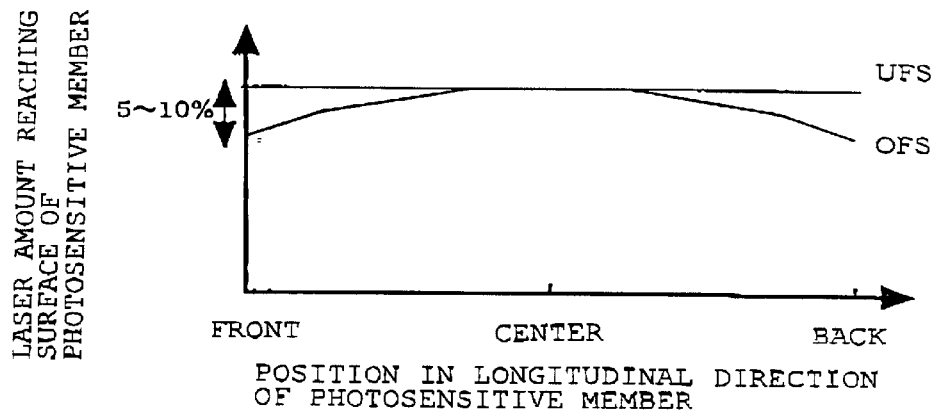
FIG. 4 is a diagram showing an amount of laser light reaching a surface of a photosensitive member (in the longitudinal direction of the photosensitive member)

Therefore, the image forming conditions operating device 14 estimates a potential at the end based on a distribution of the amounts or laser light as shown in FIG. 4. That is, the image forming conditions operating device 14 estimates the potential at the end as 100V based on the laser exposed part potential $V_L$ 70V read by the potential detecting sensor 4. Then, the image forming conditions operating device 14 adds the fog contrast $V_{BACK}$ of 150V as the predetermined value at which a fog is not generated at the end, and determines a development bias DC component $V_{DC}$ as 250V.

In addition, if the potential detecting sensor 4 is provided at an end in the longitudinal direction of the image forming region on the surface of the photosensitive member 1, the image forming conditions operating device 14 adds the fog contrast $V_{BACK}$ of 150V as the predetermined value at which a fog is not generated at the end to the laser exposed part potential $V_L$ 100V at the end read by the potential detecting sensor 4, and determines that the development bias DC component $V_{DC}$ is 250V.

Figure 5:
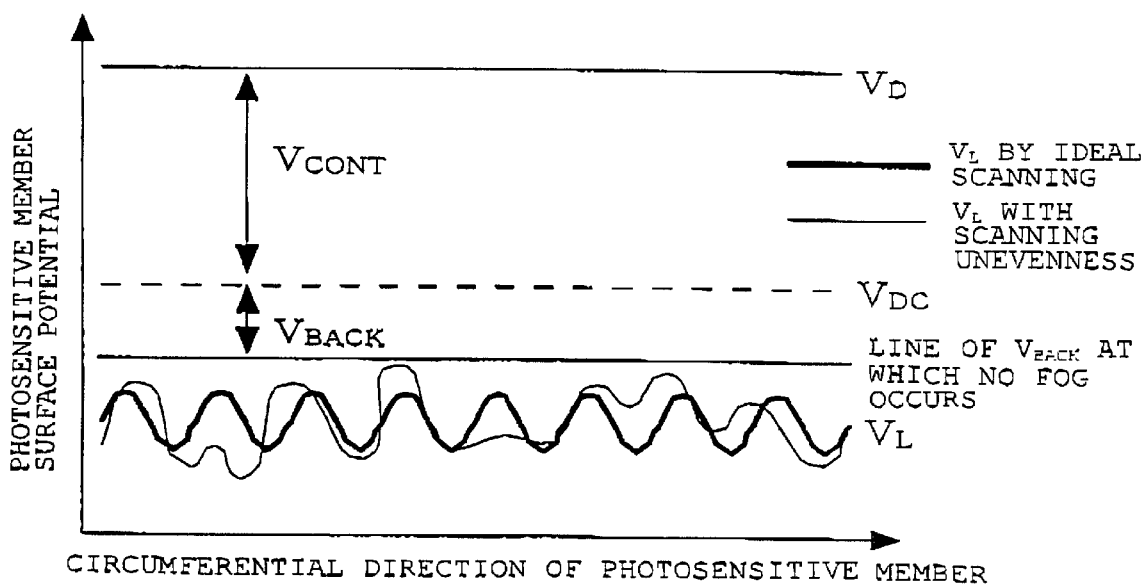
FIG. 5 is a diagram showing an influence of a $V_L$ unevenness in the BAE method (in the circumferential direction of the photosensitive member)

Moreover, if the laser exposed part potential $V_L$ at the end that is estimated on a read value by the potential detecting sensor 4 provided at the central part or the laser exposed part potential $V_L$ at the end that is read by the potential detecting sensor 4 provided at the end exceeds a predetermined potential, the image forming conditions operating device 14 controls to increase an amount or light from the laser 12 such that the laser exposed part potential $V_L$ at the end becomes the predetermined potential. Here, the predetermined potential is the sum of development contrast potential $V_{CONT}$ and the fog contrast $V_{BACK}$ as shown in FIG. 5, and is determined by a characteristic of the image forming apparatus. (Development contrast potential $V_{CONT}$=non-exposed part potential $V_D$-Development bias DC component $V_{DC}$) In addition, the image forming conditions operating device 14 may be controlled to increase an amount of light from the laser 12 if a difference between the set development bias DC component $V_{DC}$ and the laser exposed part potential $V_L$ at the end decreases.

A development bias controlling device 15 as a development bias power source performs development by setting the development bias DC component $V_{DC}$ calculated by the image forming conditions operating device 14 to be 250V and applying it to the developing device 6. Thus, occurrence of a fog can be prevented regardless of a scan unevenness of the polygon mirror, and a scan unevenness is not generated in a non-image part either.

Moreover, since the BAE method is used in the OFS method suitable for high speed image forming is used, an image unevenness by the OFS method can be prevented without increasing the development contrast potential $V_{CONT}$, and images of high resolution can be outputted at a high speed of 50 pieces per minute.

In addition, although the cases in which an a-Si photosensitive member is used are described above, photosensitive bodies other than an a-Si photosensitive member can output images of high resolution at a high speed and realize prevention of occurrence of a fog or a scan unevenness at reduced costs by using the BAE method in the OFS method.

Then, it is assumed that a period of endurance lasts long, a charging characteristic and a photosensitive characteristic of the photosensitive member 1 change, and the non-exposed part potential $V_D$ decreases to 490V and the laser exposed part potential $V_L$ increases to 110V. At this point, since the fog contrast $V_{BACK}$ of 150V, which is the same as the value before endurance, in order to prevent occurrence of a fog, the development bias DC component $V_{DC}$ is 260V.

Whereas the development contrast potential $V_{CONT}$ before endurance was 250V (=500−250), the development contrast potential $V_{CONT}$ after endurance is 230V (=490−260).

An OPC (organic photosensitive member) that is used in general will now be described. An OPC photosensitive member has an advantage in that it is inexpensive. However, the charging characteristic and the photosensitive characteristic often deteriorate as endurance lasts long, and changes occur in the non-exposed part potential ($V_D$) and the exposed part potential ($V_L$).

Figure 6:
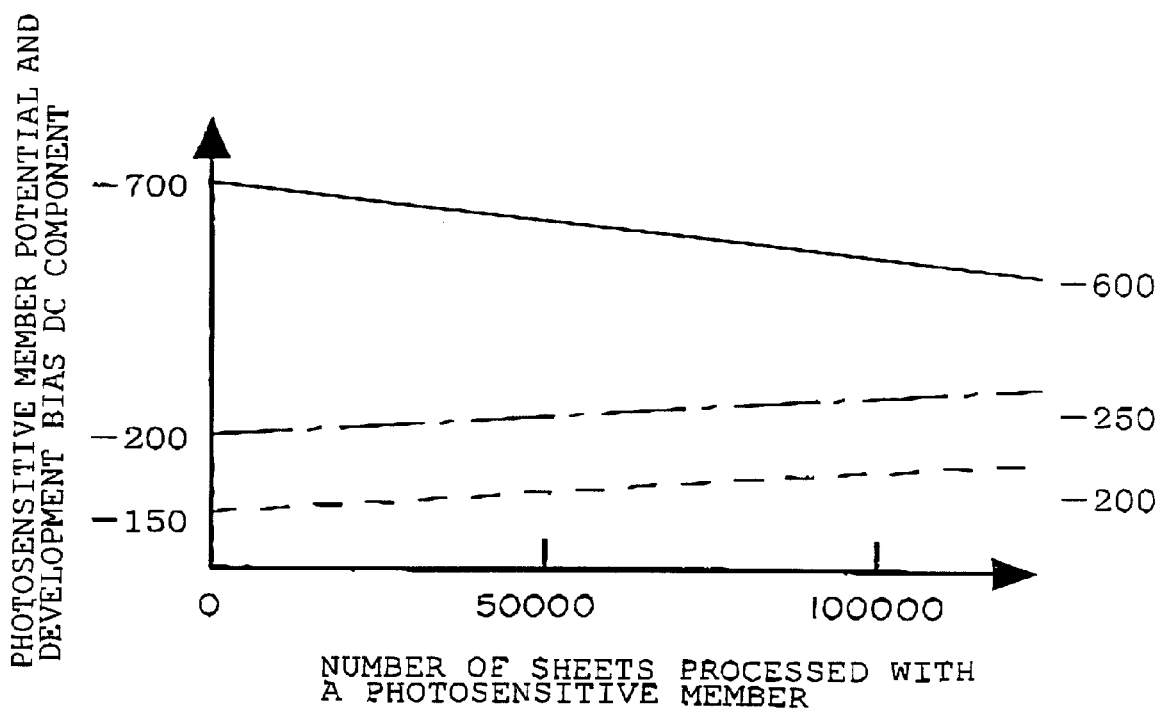
FIG. 6 is a diagram showing a process of deterioration of a charging characteristic and a photosensitive characteristic accompanying endurance of an OPC photosensitive member.
Figure 7:
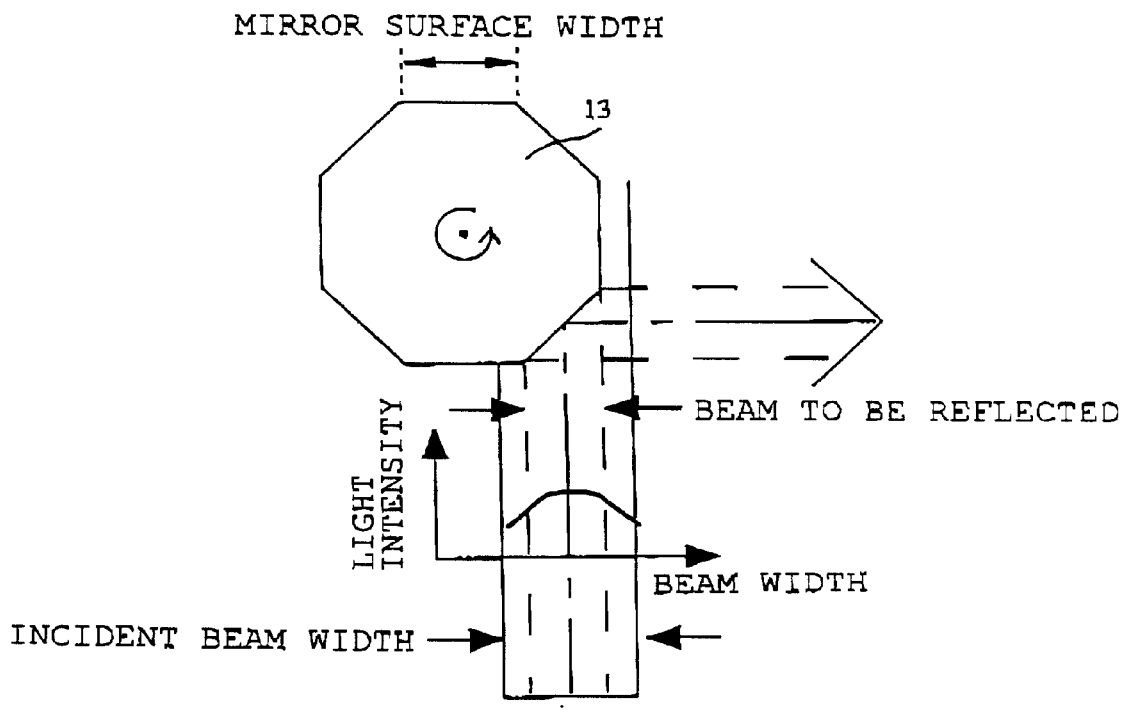
FIG. 7 is a view showing a relation among a width of an incident beam in an OFS method, a reflected beam and a width of a mirror surface.
Figure 8:
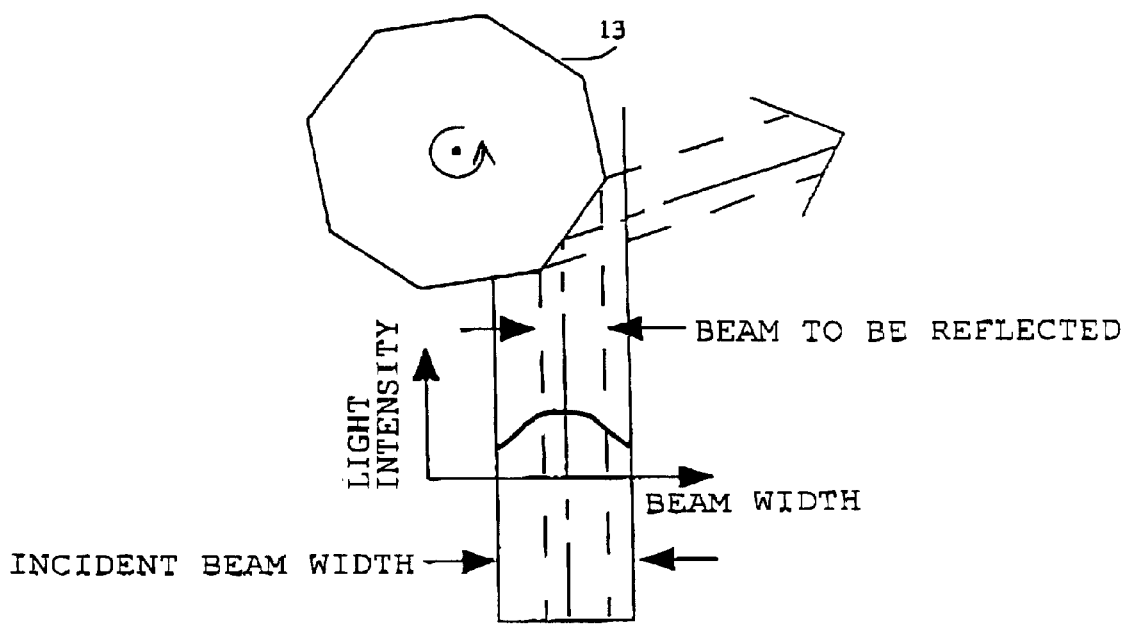
FIG. 8 is a view showing a relation between a width of an incident beam in the OFS method and a reflected beam when a polygon mirror is rotated from FIG. 7.
Figure 9:
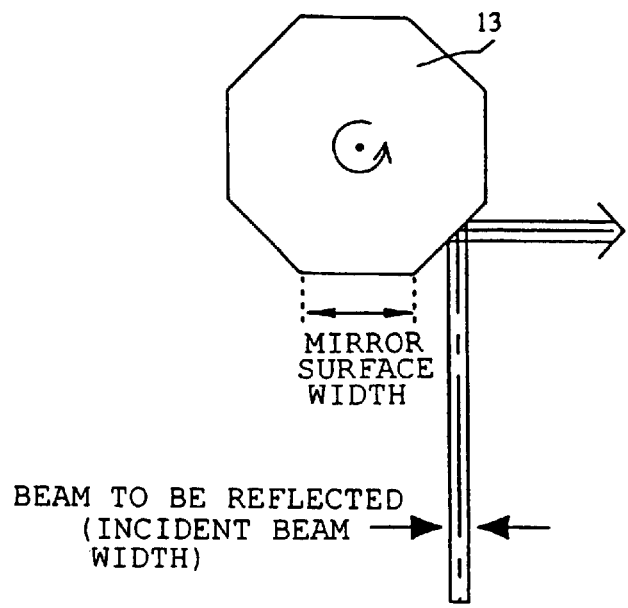
FIG. 9 is a view showing a relation among a width of an incident beam in a UFS method, a reflected beam and a mirror surface width.
Figure 10:
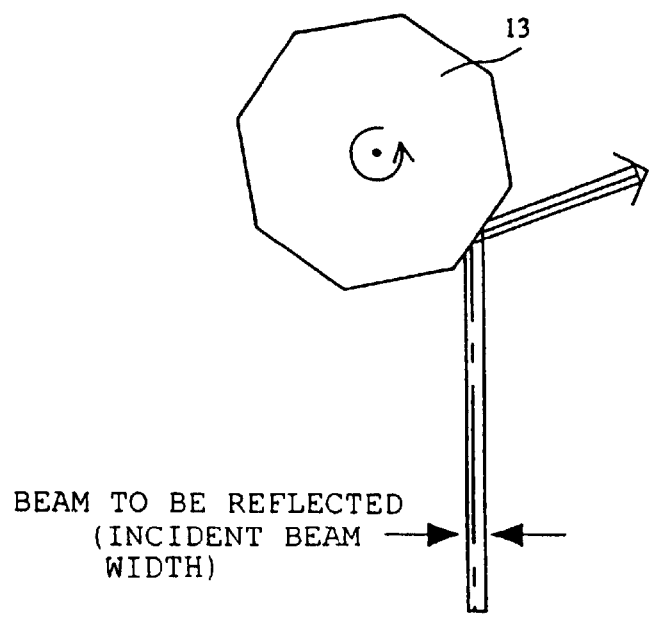
FIG. 10 is a view showing a relation between a width of a beam incident on the UFS and a reflected beam when a polygon mirror is rotated from FIG. 9.
Figure 11:
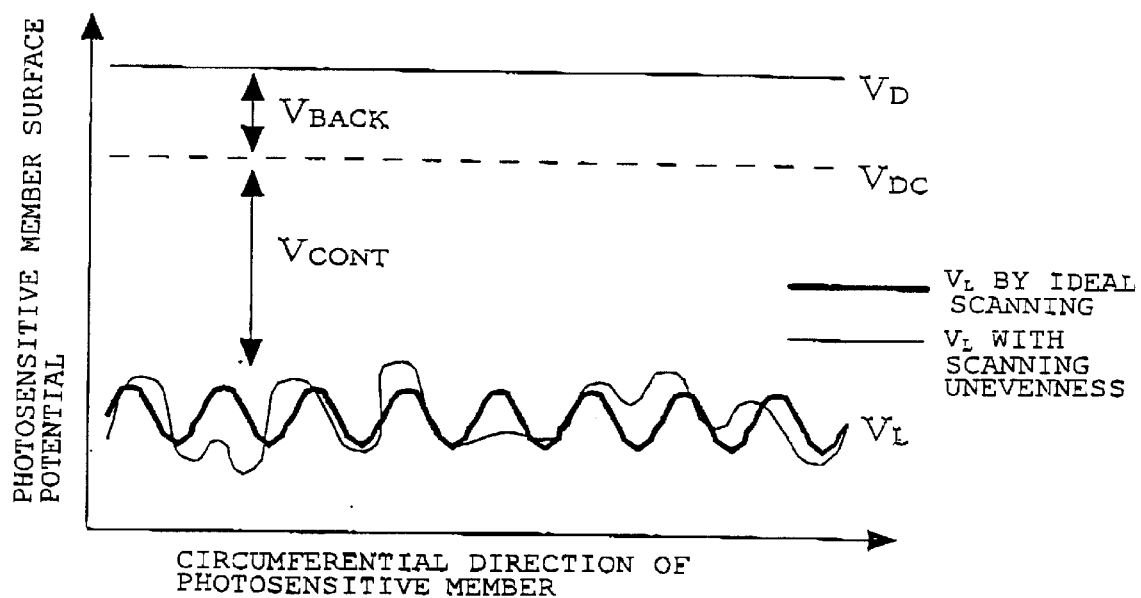
FIG. 11 is a diagram showing an influence of a VL unevenness in an IAE method (in the circumferential direction of a photosensitive member)
Figure 12:
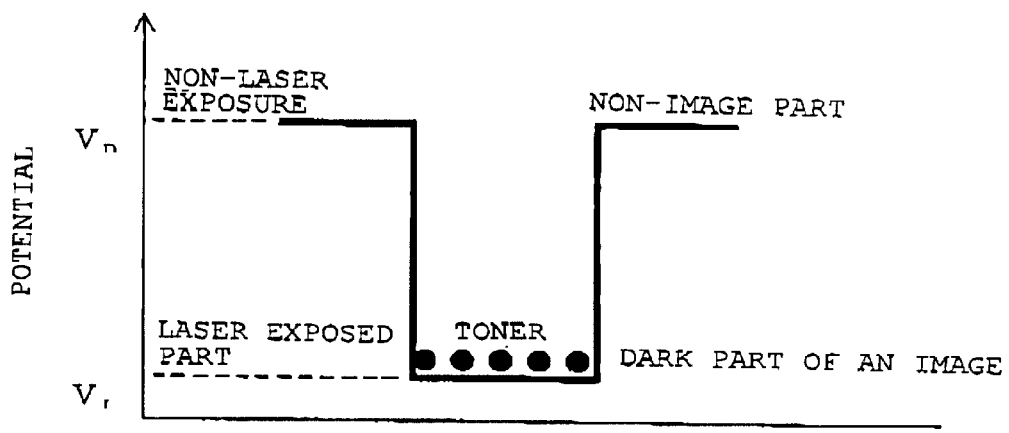
FIG. 12 is a diagram showing an association of an exposed part and an image part of the IAE method.

A deterioration phenomenon in the charging characteristic and the photosensitive characteristic accompanying endurance in the case in which the BAE method is used in the OPC photosensitive member is shown in FIG. 6 as an example. A solid line indicates the deterioration of the charging characteristic (decrease in the non-exposed part potential $V_D$ that is a potential in an image part), and a broken line indicates the deterioration of the photosensitive characteristic (increase in the laser exposed part potential $V_L$ that is a potential in a non-image part). In addition, the absolute value of the development bias DC component is set 50V larger than the potential of the non-image part in order to prevent attachment of toner (fog) to the non-image part, which is indicated by an alternate long and short dash line. It is seen from the figure that the development contrast potential $V_{CONT}$ that is 500V at an initial period decreases to 350V after endurance for 100,000 pieces.

As described above, a change in a potential due to endurance is about 100V in each of the non-exposed part potential $V_D$ and the laser exposed part potential $V_L$ in the OPC photosensitive member. In contrast, a change in $V_{CONT}$ is hardly observed in the a-Si photosensitive member.

That is, influences on an image density by endurance can be almost eliminated and a quality image close to an initial state can be realized by using the a-Si photosensitive member.

[Second Embodiment]

In a second embodiment, an image forming apparatus in which the potential detecting sensor 4 is disposed a little to the central part from the end in the longitudinal direction of the image region on the surface of the photosensitive member 1 in order to feed a sheet through the central part will be described. Further, like components as in the first embodiment are denoted by like reference numerals, and their descriptions are omitted.

The laser exposed part potential $V_L$ on the surface of the photosensitive member 1 on which an electrostatic latent image is formed is read by the potential detecting sensor 4 disposed at a position other than the end and the central part in the longitudinal direction of the photosensitive member 1. In reading the laser exposed part potential $V_L$, since the laser light is irradiated more in amount at this position than at the end, a read value is 85V.

The image forming conditions operating device 14 estimates the potential at the end as 100V taking a difference of values of the laser exposed part potential $V_L$ at this sensor position and at the end into consideration based on the distribution of the amounts of laser light as shown in FIG. 4. Then, the image forming conditions operating device 14 adds the fog contrast $V_{BACK}$ of 150V as a predetermined value at which no fog is generated at the end, and determines that the development bias DC component $V_{DC}$ is 250V.

Since a sheet can be fed through the center by detecting a potential at a position other than the central part and the end in the longitudinal direction by the potential detecting sensor 4, the image forming apparatus can cope with various sizes of sheets.

An error between this case and the case in which the DC component development bias is determined from the value of the potential detecting sensor 4 disposed at the end is smaller compared with error between the case in which the DC component of development as is estimated on the value of the potential detecting sensor disposed at the central part.

Therefore, occurrence of a fog can be prevented and a quality age can be outputted at a high speed.

Dimensions, materials and shapes of components and relative arrangement of them described in the above-mentioned embodiments should be properly changed according to a configuration of an apparatus to which the present invention is applied or various conditions, and do not intend to limit the scope of the present invention to the above-mentioned embodiments.

What is claimed is:

1. An image forming apparatus comprising:
   an image bearing member for bearing an electrostatic image;
   a light source for emitting a laser beam modulated according to an image signal;
   a rotational polygon mirror for reflecting the laser beam emitted by said light source in order to scan said image bearing member, wherein a width in a rotational direction of a reflecting surface of said rotational polygon mirror is narrower than a beam width of the laser beam incident on said rotational polygon mirror, and a potential of the image bearing member exposed by the laser beam reflected and scanned by said rotational polygon mirror is higher on an end part than on a central part in a scanning direction;
   a developer for developing a non-exposed part of an electrostatic image on said image bearing member;
   a potential detector for detecting the potential of said image bearing member; and
   a development controller for controlling developing conditions of said developer based on the potential detected by said potential detector.

2. An image forming apparatus according to claim 1, wherein said potential detector detects a potential of a central part in the scanning direction of said image bearing member.

3. An image forming apparatus according to claim 1, wherein said potential detector detects a potential of an end part in the scanning direction of said image bearing member.

4. An image forming apparatus according to claim 1, wherein said potential detector detects a potential of a part between a central part and an end part in the scanning direction of said image bearing member.

5. An image forming apparatus according to claim 1, further comprising a light amount controller for controlling an amount of light of the laser beam emitted by said light source on the basis of an output of said potential detector.

6. An image forming apparatus according to claim 1, wherein said development controller controls a development bias voltage value applied to said developer.

7. An image forming apparatus according to claim 6, wherein said development controller sets the development bias voltage value to a value calculated by adding a prescribed value to the surface potential detected by said potential detector.

* * * * *